United States Patent [19]

Oleck et al.

[11] 4,440,630

[45] Apr. 3, 1984

[54] PROCESS FOR SIMULTANEOUS HYDRODESULFURIZATION AND HYDRODEWAXING WITH A CATALYST OF CONTROLLED PORE SIZE AND METALS CONTENT

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 430,159

[22] Filed: Sep. 30, 1982

Related U.S. Application Data

[62] Division of Ser. No. 346,439, Feb. 8, 1982.

[51] Int. Cl.$^3$ .............................................. C10G 47/20
[52] U.S. Cl. ................................ 208/111; 208/216 PP
[58] Field of Search ......................... 208/216 PP, 111

[56] References Cited

U.S. PATENT DOCUMENTS

| | | | |
|---|---|---|---|
| 3,814,683 | 6/1974 | Christman et al. | 208/216 PP |
| 3,894,938 | 7/1975 | Gorring et al. | 208/216 PP |
| 3,968,024 | 7/1976 | Gorring et al. | 208/216 PP |
| 4,008,149 | 2/1977 | Itoh et al. | 208/216 PP |
| 4,013,547 | 3/1977 | Mickelson | 208/216 PP |
| 4,162,962 | 7/1979 | Strangeland | 208/97 |
| 4,229,282 | 10/1980 | Peters et al. | 208/111 |
| 4,259,170 | 3/1981 | Graham et al. | 208/111 |

*Primary Examiner*—Delbert E. Gantz
*Assistant Examiner*—Lance Johnson
*Attorney, Agent, or Firm*—Alexander J. McKillop; Michael G. Gilman; Charles J. Speciale

[57] ABSTRACT

A single stage catalyst system and process for using same in a single stage operation for hydrodewaxing and hydrotreating petroleum residua is disclosed. The catalyst comprises a ZSM-5 type zeolite in an alumina binder having specified metals content and pore volume characteristics.

7 Claims, No Drawings

PROCESS FOR SIMULTANEOUS HYDRODESULFURIZATION AND HYDRODEWAXING WITH A CATALYST OF CONTROLLED PORE SIZE AND METALS CONTENT

This is a division of copending application Ser. No. 346,439, filed Feb. 8, 1982.

CROSS REFERENCE TO RELATED APPLICATIONS

This application is related to application Ser. No. 310,550, filed Oct. 13, 1981, in the name of Frederick Banta et al entitled PROCESS FOR HYDROTREATING PETROLEUM RESIDUA AND CATALYST THEREFOR.

BACKGROUND OF THE INVENTION

1. Field of The Invention

This application is directed to a single catalyst system and process for using same in a single stage operation for hydrodewaxing and hydrotreating various petroleum residua.

2. Description of The Prior Art

It is well known that many if not most petroleum base stocks contain contaminants, as for example sulfur, nitrogen and metals. It is desirable particularly if these feedstocks are to be further processed that the contaminants be removed. This is an operation usually requiring use of a catalyst.

It has been conventional in the art to effect sulfur removal from hydrocarbon stocks by subjecting them to treatment with hydrogen at elevated temperature and pressure while in contact with a catalyst containing hyrogenating components. Typically the hydrogenating components of such prior art catalysts are Group VI-B or Group VIII metals, or their oxides or sulfides. These hydrogenating components may be supported on a variety of well-known carriers, for example, alumina, kieselguhr, zeolitic molecular sieves and other materials having high surface areas; U.S. Pat. No. 4,080,296. U.S. Pat. No. 3,546,103 teaches hydrodesulfurization with a catalyst of cobalt and molybdenum on an alumina base. U.S. Pat. No. 3,755,145 describes a process for preparing lube oils characterized by low pour points which utilizes a catalyst mixture comprising hydrogenation components, a conventional cracking catalyst which can be either crystalline or amorphous and a crystalline aluminosilicate of the ZSM-5 type.

U.S. Pat. No. 3,894,938 relates to the catalytic dewaxing and desulfurization of high pour point, high sulfur gas oils to lower their sulfur content by contacting such an oil first with a ZSM-5 type zeolite hydrodewaxing catalyst which may contain a hydrogenation/dehydrogenation component in the presence or absence of added hydrogen followed by conventional hydrodesulfurization processing of the dewaxed intermediate.

Copending application Ser. No. 310,550, filed Oct. 13, 1981, discloses and claims a single stage operation for hydrotreating and hydrodewaxing of petroleum residua using a dual catalyst system, i.e. a hydrodesulfurization catalyst combined with a metal-containing ZSM-5 hydrodewaxing catalyst.

However, neither the prior art mentioned above nor said copending application have combined, in a single stage operation, the hydrodewaxing and hydrotreating of petroleum resids using a single catalyst system.

SUMMARY OF THE INVENTION

This invention is directed to a single catalyst system wherein the hydrotreating and hydrodewaxing of petroleum residua is carried out in a single stage process. This invention is further directed towards a single catalyst system comprising a metal-containing ZSM-5 type hyrodewaxing catalyst and a binder wherein the catalyst has a particular pore volume distribution and wherein the ratio of ZSM-5 to binder is within certain specified ranges so as to obtain a balanced catalyst which effects both hydrodewaxing and hydrodesulfurization in a single stage operation.

DESCRIPTION OF PREFERRED EMBODIMENTS

The present invention is predicated on the discovery that formulating a catalyst comprising a hydrogenation component which comprises at least one Group VIB metal and at least one Group VIII metal selected from the group consisting of nickel, cobalt or iron, a ZSM-5 type zeolite, and a particular alumina so as to obtain a product having about 80% of its pore volume in pores no greater than 100 Angstrom units in diameter and at least 90% of its pore volume in pores no greater than 150 Angstrom units in diameter makes it possible to carry out hydrotreating and hydrodewaxing of petroleum residua in a single stage operation while obtaining products meeting both sulfur and pour point specifications such that further processing is unnecessary. Quite obviously, this is a potential economic advantage since it eliminates subsequent processing steps which have heretofore been necessary and produces a product fraction that would be good enough to add to the refinery distillate pool without any further treatment with regard to pour point of sulfur reduction.

As will be demonstrated in the comparative examples, until the present invention it had not been possible to obtain a catalyst which possessed both desulfurization and hydrodewaxing properties such that a product could be obtained which met both pour point and sulfur specifications in a single catalyst, single stage operation.

In general, it is well known in this art that ZSM-5 is an extremely effective catalyst for the hydrodewaxing of various petroleum fractions, including petroleum residua in that it effectively and uniquely lowers the pour point of said fraction. It is also known in the art that cobalt-molybdenum or nickely-molybdenum on alumina is an extremely effective desulfurization catalyst which can effectively lower the sulfur content of a particular feed but it has absolutely no affect on pour point. For reasons which are not completely understood, it has been found that when ZSM-5, nickel-molybdenum or cobalt-molybdenum, and alumina are composited together in order to obtain both a low pour point and a low sulfur content, the catalytic properties of the components of the various mixtures are influenced by the other components in the mixture. Thus, for example, it is possible to meet sulfur specifications with a nickel and molybdenum on alumina catalyst to which no ZSM-5 is added for both the 650°–750° F. fraction, as well as the 750+ bottoms fraction, i.e. this material functions as an effective desulfurization catalyst. However, when these materials are combined with ZSM-5, for reasons which are not completely understood, desulfurization activity of the catalyst is affected, particularly with regard to its ability to reduce the sulfur content of the bottoms fraction to within target specifications.

Thus, until the present invention, it was not possible to balance both hydrodewaxing activity and desulfurization activity in a single catalyst system.

The first requirement for obtaining a successful catalyst in accordance with the novel process of this invention is that the catalyst contain a particular pore size distribution. In this connection, it is absolutely essential that the catalyst have about 80% of its pore volume no greater than 100 Angstrom units in diameter and that greater than 90% of its pore volume be in pores no greater than 150 Angstrom units in diameter.

It has been found that unless a catalyst contains the pore volumes, above-identified, it is not possible to balance both the hydrodewaxing and the hydrodesulfurization activity in a single catalyst system.

However, just merely having the above pore volume is not enough in order to obtain a successful catalyst. It is also necessary to balance the metal content of the catalyst with the amount of ZSM-5 which is in the catalyst. In general, it can be stated that the more ZSM-5 that there is, the more metals can be present. In this connection, the ZSM-5 content of the catalyst usually ranges from about 10–30 weight percent, preferably 15–25 wt. % based on alumina plus ZSM-5. The metals content which is defined as being both the Group VIB metal and the Group VIII metal, most preferably nickel and molybdenum, can range from about 110 to about 25 weight percent, expressed as oxides, based on total catalyst with the higher figure being utilized for the catalyst containing the greater amount of zeolite and conversely, the lower figure being used for the ctalyst containing the lower amount of zeolite. It is submitted that one skilled in the art based on the teachings of the instant application can successfully arrive at a particular metals loading level and a particular ZSM-5 content depending on the characteristics of the charge stock and the desired properties of the product.

The relative proportion of Group VIII metal to Group VIB metal, expressed as oxides, in the novel system of this invention is not narrowly critical but Group VIB, e.g. molybdenum, is usually utilized in greater amounts than the Group VIII metal, e.g. nickel. In general, the weight of Group VIB metal to Group VIII metal, expressed as oxides, based on total catalyst should range from 3 to 4 with 3.5 being particularly preferred.

Typical process conditions utilized in carring out the novel process of this invention include a hydrogen pressure of about 500–3000 psig, a temperature of about 600°–850° F., and 0.1–5 LHSV based on the total complement of catalyst in the system.

As is known in the art, ZSM-5 type zeolitic materials are members of a novel class of zeolites that exhibit unusual properties. Although these zeolites have unusually low alumina contents, i.e. high silica-to-alumina ratios, they are very active even when the silica-to-alumina ratio exceeds 30. The activity is surprising, since catalytic activity is generally attributed to framework aluminum atoms and/or cations associated with these aluminum atoms. The zeolites retain their crystallinity for long periods in spite of the presence of steam at high temperature which induces irreversible collapse of the framework of other zeolites, e.g. of the X and A type.

An important characteristic of the crystal structure of this class of zeolites is that it provides constrained access to and egress from the intracrystalline free space by virtue of having an effective intermediate pore size, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica-to-alumina mole ratio of at least about 12; and a structure providing constrained access to the crystalline free space.

The silica-to-alumina ratio referred to may be determined by conventional analysis. This ratio is meant to represent, as closely as possible the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites useful in this invention have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although in some instances excessive puckering of the rings or pore blockage may render these zeolites ineffective. Twelve-membered rings usually do not offer sufficient constraint to produce the advantageous conversions, although the puckered 12-ring structure of TMA offretite shows constrained access. Other 12-ring structures may exist which, due to pore puckering or to other cause, may be operative.

Rather than attempt to judge from crystal structure whether or not a zeolite possesses the necessary constrained access to molecules larger than normal paraffins, a simple determination of the "Constraint Index" as herein defined may be made by passing continuously a mixture of an equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium, and the temperature adjusted between 500° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows: Constraint Index =

$$\frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (C.I.) values for some typical crystalline aluminosilicates (CAS) zeolites are:

| CAS | C.I. |
|---|---|
| ZSM-5 | 8.3 |
| ZSM-11 | 8.7 |
| ZSM-12 | 2 |
| ZSM-35 | 4.5 |
| ZSM-38 | 2 |
| TMA Offretite | 3.7 |
| Beta | 0.6 |
| ZSM-4 | 0.5 |
| H-Zeolon (Mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12 and therefore within the scope of the novel class of highly siliceous zeolites are those zeolites which, when tested under two or more sets of conditions within the above specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein reference.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-35, and ZSM-38, with ZSM-5 being particularly preferred.

In a preferred aspect of this invention, the zeolites hereof are selected as those having a crystal framework density in the dry hydrogen form, of not less than about 1.6 grams per cubic centimeter. The preferred zeolites of this invention are those having a Constraint Index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by mercury porosimetry, since mercury will fill the interstices between crystals but will not penetrate the intracrystalline free space. It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

| ZEOLITE | VOID VOLUME | FRAMEWORK DENSITY |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.57 |
| Levynite | .40 | 1.54 |
| Erionite | .35 | 1.51 |
| Gmelinite | .44 | 1.46 |
| Chabazite | .47 | 1.45 |

|  | VOID | FRAMEWORK |
| ZEOLITE | VOLUME | DENSITY |
| --- | --- | --- |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5% by weight may be used.

As has heretofore been stated, an essential ingredient of the catalyst of this invention is alumina. Alumina is present in the catalyst in amounts ranging from 70 to 90 weight percent based on the weight of alumina plus ZSM-5 type zeolite. As is well known by those skilled in the art, the characteristic of composited alumina catalysts depends to a very large extent on the properties of the alumina.

An alumina possessing characteristics which are eminently suitable for the preparation of the novel catalyst of this invention is one manufactured by the American Cyanamid Company under their tradename PA Alumina Powder. Aluminas which are not suitable for preparing the novel catalyst compositions of this invention include one manufactured by Kaiser Aluminum and Chemical Corporation under their tradename SA Alumina Powder, as well as one manufactured by Conoco Chemicals Company under their tradename CATAPAL SB.

The novel catalyst of this invention is typically prepared by mixing ZSM-5 with a suitable alumina such as Cyanamid PA followed by extruding, calcining, exchanging to low sodium content, drying, impregnating with a Group VI metal salt solution, drying, impregnating with a Group VIII metal salt solution, and re-calcining. Other methods can be employed to prepare the catalyst of this invention.

The following examples will illustrate the novel process of this invention.

EXAMPLE 1

Four 5 wt. % NiO—17 wt% $MoO_3$ catalysts, identified as Catalysts A, B. C and D, were prepared by impregnating 1/16 inch diameter, cylindrical extrudates to incipient wetness first with ammonium heptamolybdate solution and then with nickel(ous) chloride solution and calcining.

The extrudate for Catalyst A comprised 20 wt. % ZSM-5 and 80 wt. $Al_2O_3$. The $Al_2O_3$ source was PA alumina powder from American Cyanamid Company.

The extrude for Catalyst B comprised 30 wt. % ZSM-5 and 70 wt. % $Al_2O_3$. The $Al_2O_3$ source was Kaiser SA medium powder from Kaiser Aluminum and Chemical Corporation.

The extrudate for Catalyst C comprised 15 wt. % ZSM-5 and 85 wt. % $Al_2O_3$ from Kaiser SA medium powder.

The extrudate for Catalyst D comprised 100% $Al_2O_3$ from Kaiser SA medium powder.

The physical properties of Catalysts A, B, C and D are shown in Table 1.

TABLE 1

| Alumina Type | Cyanamid PA | Kaiser SA | | |
| --- | --- | --- | --- | --- |
| Catalyst No. | A | B | C | D |
| Density, g/cc | | | | |
| Packed | 0.80 | 0.62 | 0.67 | 0.65 |
| Particle | 1.36 | 1.15 | 1.14 | 1.16 |
| Real | 3.69 | 3.30 | 3.49 | 3.64 |
| Pore Vol, cc/g | 0.462 | 0.567 | 0.590 | 0.589 |
| Surface Area, m²/g | 261 | 227 | 199 | 186 |
| Av. Pore Dia., Å | 71 | 100 | 119 | 127 |
| Pore Vol. Dist. PV % in Pores of | | | | |
| <100Å Dia. | 83 | 45 | 38 | 34 |
| 100–150Å | 14 | 31 | 27 | 51 |
| 150–200Å | 1 | 15 | 31 | 11 |
| >200Å | 2 | 9 | 4 | 4 |

Catalysts A, B, C and D were evaluated for their ability to desulfurize and dewax an Arab Light atmospheric resid in a single-catalyst, trickle-bed operation at 750° F., 0.5 LHSV, 2000 psig, 5000 SCF $H_2$/bbl. to obtain the following target values:

| Fraction | Sulfur, wt. % maximum | Pour Point, °F. maximum |
| --- | --- | --- |
| 650–775° F. | 0.3 | 0 |
| 775° F.+ | 0.5 | — |

The properties of the charge stock were as follows:

| Gravity, °API | 19.8 |
| --- | --- |
| Hydrogen, wt. % | 11.78 |
| Sulfur, wt. % | 2.89 |
| Nitrogen, wt. % | 0.14 |
| Asphaltenes, wt. % | 4.9 |
| Nickel, ppm | 6 |
| Vanadium, ppm | 28 |
| Distillation, °F. | |
| 10 Vol. % | 559 |
| 30 Vol. % | 716 |
| 50 Vol. % | 877 |

The results obtained are shown in the following table:

TABLE 2

| Alumina Type | | | PA | SA | → | → |
| --- | --- | --- | --- | --- | --- | --- |
| Catalyst | | | A | B | C | D |
| ZSM-5, wt. % | | | 20 | 30 | 15 | 0 |
| | Chg Stk | Target Max. | | | | |
| Fraction 650—775° F. | | | | | | |
| Sulfur, wt. % | 2.2 | 0.3 | 0.1 | 0.2 | 0.3 | 0.2 |
| Pour Point, °F. | 60 | 0 | 0 | −65 | −45 | 60 |
| 775° F.+ | | | | | | |
| Sulfur, wt. % | 3.3 | 0.5 | 0.4 | 0.9 | 0.7 | 0.5 |

Only Catalyst A has the desired pore volume distribution as shown in Table 1, and it is only Catalyst A that produced fractions that met all the target specifications of sulfur and pour point. The quality of the 650°–775° F. fraction is good enough to add to the distillate pool, thus upgrading this fraction to distillate.

Catalysts B, C, and D do not have the desired pore volume characteristics. The results demonstrate that it would not be possible to adjust the ZSM-5 and $Al_2O_3$ contents to produce a catalyst with the desired balance of desulfurization and dewaxing activities.

EXAMPLE 2

This example illustrates that a catalyst must have not only the required pore volume distribution, but also a proper balance of ZSM-5 content and metal (NiO—MoO$_3$) content.

A catalyst, identified as Catalyst E, was prepared exactly like Catalyst A of Example 1, with the exception that the ZSM-5 content of the extrudate base was only 15 wt. %.

A second catalyst, identified as Catalyst F, was prepared like Catalyst, E, but with less nickel and molybdenum (3.5 wt. % NiO and 12 wt. % MoO$_3$).

The properties of Catalysts A, E, and F, listed in Table 3, show that all three have the specified pore size distribution.

TABLE 3

| Alumina source | ← | PA | → |
|---|---|---|---|
| Catalyst | A | E | F |
| ZSM-5, wt. % | 20 | 15 | 15 |
| Metals, wt. % | | | |
| NiO | 5 | 5 | 3.5 |
| MoO$_3$ | 17 | 17 | 12 |
| Metals/ZSM 5 wt. ratio | 1.1 | 1.5 | 1.0 |
| Pore Vol. Dist. | | | |
| PV % in pores of | | | |
| <100Å Diameter | 83 | 93 | 88 |
| 100–150Å Diameter | 14 | 2 | 8 |
| 150–200Å Diameter | 1 | 2 | 1 |
| >200Å Diameter | 2 | 3 | 3 |
| Density, g/cc | | | |
| Packed | 0.80 | 0.81 | 0.73 |
| Particle | 1.36 | 1.39 | 1.27 |
| Real | 3.69 | 3.99 | 3.46 |
| Pore Volume, cc/g | 0.462 | 0.469 | 0.496 |
| Surface Area, m$^2$/g | 261 | 224 | 267 |
| Av. Pore Dia., Å | 71 | 84 | 74 |

The catalysts were evaluated as in Example 1 with the following results:

| | Target Max. | Catalyst A | Catalyst E | Catalyst F |
|---|---|---|---|---|
| 650–775° F. Fraction | | | | |
| Sulfur, wt. % | 0.3 | 0.1 | 0.1 | <0.1 |
| Pour Point, °F. | 0 | 0 | 35 | −5 |
| 775° F.+ | | | | |
| Sulfur wt. % | 0.5 | 0.4 | 0.4 | 0.4 |

As can be seen from the above tabulations, all three catalysts were prepared from the same alumina source and have the required pore volume distribution. However, only Catalysts A and F were able to meet the targets specified for the fractions. Catalyst E evidently has too much metal loading, (22 wt. % NiO+MoO$_3$) for the amount of ZSM-5, because Catalyst F with only 15.5 wt. % NiO+MoO$_3$ was successful in giving acceptable results.

What is claimed is:

1. A process for simultaneously catalytically hydrodesulfurizing and hydrodewaxing a petroleum residual oil or other suitable petroleum base stock, said process consisting essentially of contacting a mixture of hydrogen and said residual oil at a hydrogen pressure of from about 500 to 3,000 psig, a temperature of from about 600° to 850° F. and a space velocity of from about 0.1 to 5.0 LHSV with a catalyst consisting essentially of 15–25 wt. % of a ZSM-5 type zeolite, 90–70 wt. % of alumina, based on alumina plus zeolite, and a metal content of 10–25 wt. %, expressed as oxides, of at least one Group VIII metal selected from the group consisting of nickel, cobalt and iron, and at least one Group VIB metal, based on total catalyst, said catalyst having about 80% of its pore volume in pores no greater than 100 Angstrom units in diameter and at least 90% of its pore volume in pores no greater than 150 Angstrom units in diameter and having a metal content which is balanced with the amount of ZSM-5 type zeolite in the catalyst whereby an increase in the zeolite content is balanced with an increase in the metal content, and recovering an upgraded petroleum product characterized by the fact that its 650°–750° F. fraction has a sulfur content no higher than 0.3 weight percent and a pour point no higher than 0° F. and that at 775° F.+ fraction has a sulfur content no higher than 0.5 weight percent.

2. The process of claim 1 wherein the zeolite component of said catalyst system is selected from the group consisting essentially of ZSM-5, ZSM-11, ZSM-12, ZSM-35, and ZSM-38 and wherein said zeolites may be base exchanged.

3. The process of claim 2 wherein the zeolitic component is ZSM5 or HZSM-5.

4. The process of claim 1 wherein said ZSM-5 type zeolite is present in an amount of about 15 wt. % and said catalyst contains about 15.5 wt. %, expressed as oxides, of molybdenum and nickel.

5. The process of claim 4 wherein said ZSM-5 type zeolite is ZSM-5.

6. The process of claim 1 wherein said ZSM-5 type zeolite is present in an amount of about 20 wt. % and said catalyst contains about 22 wt. %, expressed as oxides, of molybdenum and nickel.

7. The process of claim 6 wherein said ZSM-5 type zeolite is ZSM-5.

* * * * *